Figure 1:
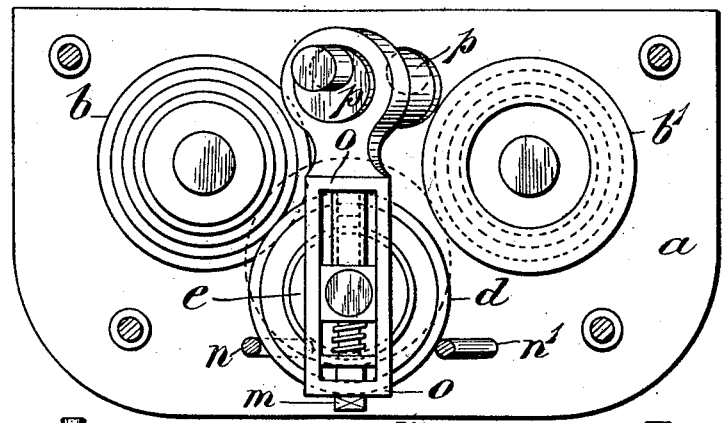

J. E. PRESTON.
VARIABLE VELOCITY RATIO FRICTION DRIVE.
APPLICATION FILED APR. 19, 1918.

1,318,588.

Patented Oct. 14, 1919.

Inventor:-
John Edward Preston.
per
Attorney.

UNITED STATES PATENT OFFICE.

JOHN EDWARD PRESTON, OF LONDON, ENGLAND, ASSIGNOR OF ONE-HALF TO WILLIAM ERNEST MORUM, OF LONDON, ENGLAND.

VARIABLE-VELOCITY-RATIO FRICTION-DRIVE.

1,318,588. Specification of Letters Patent. Patented Oct. 14, 1919.

Application filed April 19, 1918. Serial No. 229,636.

*To all whom it may concern:*

Be it known that I, JOHN EDWARD PRESTON, a subject of His Majesty King George V, of the United Kingdom of Great Britain and Ireland, and of the British Dominions beyond the Sea, and Emperor of India, residing at London, England, have invented certain new and useful Improvements in Variable - Velocity - Ratio Friction - Drives, of which the following is a specification.

This invention is for improvements in variable velocity ratio friction gear of the type which is variable in steps or stages like the belt and stepped " cone " drive commonly used on lathes. The present invention has a wide application, but being particularly suited as a drive for motor vehicles it will be hereinunder described in detail in such application, a constructional example suited to motor vehicles being illustrated in the drawings forming part of this specification.

In a variable speed gear comprising a pair of reversed stepped " cones " a single rider wheel to travel along the " cones " and to be pressed against the steps, or fillets, or driving faces, has been proposed. A single rider wheel has also been proposed in a gear comprising a series of V and groove drives of different ratio, the single rider wheel being capable of rocking about a pivot axis which is supported in a laterally movable slide.

An object of the present invention is to provide a friction drive of the type referred to, and with a single rider or intermediate wheel, which shall be strong and compact, inexpensive to produce, and simple and effective in operation.

The present invention is essentially characterized by a single intermdiate friction wheel which is mounted to slide along and free to rock about a rocking spindle so as to allow the positioning of the intermediate wheel to any two directly opposite fillets, the rocking spindle by its rotation also functioning as a long cam or eccentric adapted to force the intermediate wheel toward or upon the selected fillets or to withdraw the intermediate wheel from the fillets. The present invention is thus sharply contrasted from change-speed gears with reversed stepped " cones " in which each intermediate wheel of a series of intermediate wheels is drawn against or receded from its corresponding fillets by a system of levers with pin and inclined slot action.

The present invention in certain embodiments is further characterized by slide guide provision for easy clearance in changing.

The so called stepped " cones " or cones of friction gears form a compact collection of friction gears arranged on a shaft in steplike form, and this arrangement by reason of its compactness is preferred, but a similar arrangement but with the friction gears spaced apart or in open order may be employed.

Suitable striking gear is provided for sliding the friction wheel laterally and holding it to definite position in any of the various speed positions.

In the drawings illustrating the invention:—

Figure 1 is an elevation, and

Figure 2:
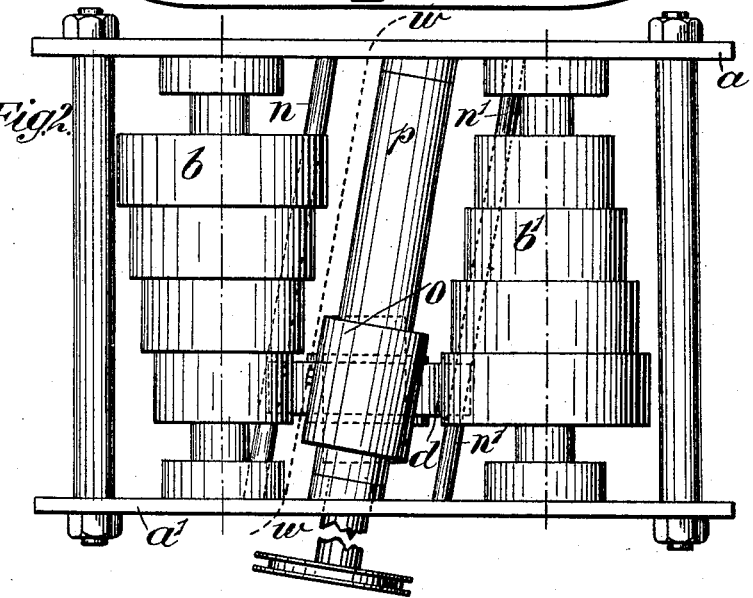

Fig. 2 a plan view of the friction gear.

Referring to the drawing $a$, $a'$ designate a pair of parallel side members or plates of a suitable gear frame or box; in these side members $a$, $a'$ are rotatably mounted a pair of reversed stepped " cones " $b$, $b'$. The shafts of the cones $b$, $b'$ are fitted with suitable driving wheels respectively, one wheel being connected for drive from for example the engine of a motor cycle, and the other wheel connected for driving for example the rear wheel of the motor cycle.

$d$ designates an intermediate friction wheel which runs on a bearing $e$ which is carried in the yoke end of a swinging arm or frame $o$, this swinging arm or frame or equivalent $o$ being mounted to both slide along and swing on a revolving bar $p$ adapted to act as a cam or eccentric to draw the friction wheel $d$ toward or move it away from the fillets or driving faces of the stepped " cones " $b$, $b'$ according to the direction of revolution of said bar $p$.

The bearing $e$ is mounted in slots in the sides of the yoke $o$ and is arranged to be normally pressed toward the " cones " by spring action which may be adjusted for pressure by the screw-in stop $m$.

The shaft $p$ may either run parallel with the axes of the stepped " cones " $b$, $b'$ or as shown, the shaft $p$ may be set obliquely, or parallel with the slope of the " cones," in which case the extent of the swing of the friction gear in finding its true transmitting position is reduced.

The separation of the axes of the stepped "cones" $b$, $b'$ is made so that grip is established by partial entry of the friction wheel $d$ between the fillets or driving faces of the "cones."

In order that the friction wheel shall be definitely directed or constrained to occupy a position clear of the step or steps of the "cones" to allow lateral movement of the friction wheel in either direction, a slide guide, as guide rods $n$, $n'$, set obliquely in accordance with the slope of the "cones," i. e., the rise of the fillets or driving faces, may be fixed to the side plates $a$, $a'$ so as to run on either side of the friction wheel $d$, see Figs. 1 and 2. In lateral movement of the friction wheel, this will swing as it slides and so follow the inclined course of the guide rods $n$, $n'$. Any equivalent guiding device may be employed.

For imparting lateral movement to the friction wheel $d$ when out of gear and clear of the steps, any suitable striking gear may be employed. For example the ends of an intensible flexible connector such as a Bowden wire $w$ may be secured to the opposite sides of the sliding frame $o$, and an intermediate part of the connector fastened to a change speed lever coöperating for example with a notched quadrant. But other "striking-gear" may be employed without departing from the present invention.

The actuating lever of the gear releasing and engaging mechanism will ordinarily work in conjunction with a climb-up ratchet by which the closeness of the driving contact can be personally regulated and the mechanism locked for maintaining the contact at any desired pressure.

On the ends of the stepped "cones", suitable reversing gears may be fixed these being normally held out of engagement and being brought into engagement when required by any suitable control.

The contacting surfaces of the drive may be of like or different substances, also they may be flat faced or ribbed and grooved, multiple V gear fashion, in accordance with known methods.

Slipping contact may be allowed for by a yielding substance, for example cork disks let into staggered or echeloned local areas or pits of the friction wheel; these areas compressing to sink flush with the driving face as full contact is established.

Otherwise or in addition any tendency of the gearing to form flats on the contacting faces in taking up the drive may be countered by appropriate use of a friction clutch, and if and when this is employed, full contact of the intermediate friction wheel with the selected faces of the stepped "cones" or equivalent may be established with the clutch out of action. The drive can then be slowly brought into action through the medium of the clutch which will thus bear the slip, and in doing so, the slip will be incident where it has the least harmful effect.

What I claim is:—

1. A variable velocity ratio friction drive consisting in combination, of a frame, a pair of reversed stepped cones rotatably mounted therein, an intermediate connecting wheel, a rotating cam-spindle, a swinging bearing for said intermediate wheel mounted on the cam-spindle so as to slide therealong and means for imparting lateral movement to the intermediate wheel when out of gear, for the purposes described.

2. A variable velocity ratio friction drive consisting in combination, of a frame, a pair of reversed stepped cones rotatably mounted therein, an intermediate connecting wheel, a rotating cam-spindle, a swinging bearing for said intermediate wheel mounted on the cam-spindle so as to slide therealong, means for imparting lateral movement to the intermediate wheel when out of gear, and means for guiding said intermediate wheel during such lateral movement, for the purposes described.

3. A variable velocity ratio friction drive consisting in combination, of a frame, a pair of reversed stepped cones rotatably mounted thereon, an intermediate connecting wheel, a rotating cam-spindle, a bearing for said intermediate wheel, a swinging arm slidably mounted on the cam-spindle and carrying said bearing, resilient means interposed between the bearing and a part of the swinging arm, and means for imparting lateral movement to the intermediate wheel and its allied parts when out of gear for the purposes described.

4. A variable velocity ratio friction drive consisting in combination, of a frame, a pair of reversed stepped cones rotatably mounted thereon, an intermediate connecting wheel, a rotating cam-spindle, a bearing for said intermediate wheel, a swinging arm slidably mounted on the cam-spindle and carrying said bearing, adjustable resilient means interposed between the bearing and a part of the swinging arm, and means for imparting lateral movement to the intermediate wheel and its allied parts when out of gear for the purposes described.

In testimony whereof, I affix my signature.

JOHN EDWARD PRESTON.